US007205959B2

(12) United States Patent
Henriksson (10) Patent No.: US 7,205,959 B2
(45) Date of Patent: Apr. 17, 2007

(54) MULTI-LAYERED DISPLAYS PROVIDING DIFFERENT FOCAL LENGTHS WITH OPTICALLY SHIFTABLE VIEWING FORMATS AND TERMINALS INCORPORATING THE SAME

(75) Inventor: Mikael Henriksson, Löddeköpinge (SE)

(73) Assignee: Sony Ericsson Mobile Communications AB, Lund (SE)

( * ) Notice: Subject to any disclaimer, the term of this patent is extended or adjusted under 35 U.S.C. 154(b) by 440 days.

(21) Appl. No.: 10/659,109

(22) Filed: Sep. 9, 2003

(65) Prior Publication Data
US 2005/0052341 A1 Mar. 10, 2005

(51) Int. Cl.
*G09G 5/00* (2006.01)
*H04M 1/00* (2006.01)
*H04B 1/38* (2006.01)
(52) U.S. Cl. ..................... 345/4; 455/566; 345/169
(58) Field of Classification Search ............ 345/1.1–7, 345/156, 169, 76, 82; 455/556.1, 556.2, 455/566
See application file for complete search history.

(56) References Cited

U.S. PATENT DOCUMENTS

| 3,857,022 | A | | 12/1974 | Rebane et al. ............. 235/151 |
| 4,449,123 | A | | 5/1984 | Muranaga ................... 340/716 |
| 5,565,894 | A | | 10/1996 | Bates et al. ................. 345/178 |
| 5,661,635 | A | * | 8/1997 | Huffman et al. ............ 361/684 |
| 6,130,665 | A | * | 10/2000 | Ericsson ...................... 345/173 |
| 6,275,932 | B1 | * | 8/2001 | Yamaguchi et al. ........... 713/2 |
| 6,396,475 | B1 | * | 5/2002 | Ellenby et al. ............. 345/156 |
| 6,556,586 | B1 | * | 4/2003 | Sipila ......................... 370/469 |
| 6,600,527 | B1 | * | 7/2003 | Basturk et al. ............... 349/74 |
| 2002/0151283 | A1 | * | 10/2002 | Pallakoff ...................... 455/90 |
| 2003/0184594 | A1 | * | 10/2003 | Ellenby et al. ............. 345/810 |
| 2004/0029636 | A1 | * | 2/2004 | Wells ........................... 463/32 |
| 2004/0239582 | A1 | * | 12/2004 | Seymour ....................... 345/5 |
| 2005/0062410 | A1 | * | 3/2005 | Bell et al. ................... 313/506 |
| 2005/0195927 | A1 | * | 9/2005 | Solonen ...................... 375/346 |

FOREIGN PATENT DOCUMENTS

| EP | 0454423 A1 | 4/1991 |
| JP | 10079906 | 3/1998 |
| JP | 2003098983 | 4/2003 |
| WO | WO 2084637 A1 * | 10/2002 |

OTHER PUBLICATIONS

PCT International Search Report, International Application No. PCT/EP2004/007552 mailed Dec. 8, 2004.
PCT Written Opinion of the International Searching Authority, Dec. 8, 2004.

* cited by examiner

*Primary Examiner*—Amr A. Awad
*Assistant Examiner*—Stephen G Sherman
(74) *Attorney, Agent, or Firm*—Myers Bigel Sibley & Sajovec PA (57) ABSTRACT

Wireless terminals with layered displays that provide different focal lengths and allow a user to view data presented on different layered displays by optically shifting his/her focus.

53 Claims, 8 Drawing Sheets

MULTI-LAYERED DISPLAYS PROVIDING DIFFERENT FOCAL LENGTHS WITH OPTICALLY SHIFTABLE VIEWING FORMATS AND TERMINALS INCORPORATING THE SAME

FIELD OF THE INVENTION

The present invention relates to the field of communications, and may be particularly suitable for portable terminals incorporating displays.

BACKGROUND OF THE INVENTION

Portable terminals such as wireless terminals can be compact and may be configured to be handheld. Certain terminals may allow a one-hand operating format. The weight and size of portable and/or wireless terminals has been decreasing with some contemporary wireless terminals being less than 11 centimeters in length and their displays sized to be correspondingly compact. In operation, it may be desirable to configure terminals so as to provide increased amounts of visual information, with audio and/or text based input/outputs, using the relatively compact displays, particularly as wireless terminals may support multiple wireless communication modalities. Thus, as the devices themselves may decrease in size, the amount of content that is displayable or desired may increase with the increase in wireless services.

SUMMARY OF THE INVENTION

Embodiments of the present invention are directed to methods for presenting text and/or visual data to a target device. The methods include: presenting text and/or visual data on a first display; and presenting text and/or visual data substantially concurrently on a second display underlying the first display. When viewed by a user, the second display may have a focal length that is longer than the first focal length.

In certain embodiments, in operation, a user is able to selectively view or focus on data on the first and/or second display by optically altering his/her focus.

Other embodiments are directed to dual layered display assemblies for a computer terminal, such as a portable device (e.g., a wireless terminal). The assembly includes: a first display; and a second display positioned under the first display. In operation, the first display is configured to provide text and/or visual data using pixels with sufficient optical transmissivity and/or transparency to allow a user to optically view through the first display to text and/or visual data on the underlying second display.

Still other embodiments are directed to wireless terminals. The wireless terminals include: (a) a housing configured to enclose a transceiver that transmits and receives wireless communications signals; (b) a first display in communication with the transceiver and held in the housing so that a corresponding first viewing surface is externally viewable; and (c) a second display in communication with the transceiver and held in the housing beneath the first display so that a corresponding second viewing surface is externally viewable, the second display disposed a further distance away from the first viewing surface of the first display. The wireless terminals are configured to concurrently present data on the first and second displays.

In certain particular embodiments, the first display may be configured as a substantially transparent (typically monochromatic) display and the second display may be configured as a color graphic display.

In certain embodiments, the first and second displays can be configured to interactively engage each other during operation. In addition, the wireless terminal may be configured to review an incoming communication signal and parse the signal into visual and text data segments and then present selected text data on the first display and visual data on the second display. The incoming communication signal may comprise a MMS ("multimedia content service" message) with at least one image and text, and wherein the wireless terminal is configured to review the message and direct the signal so that at least some of the text is presented on the first display while the at least one image is presented on the second display.

In certain embodiments, in operation, the first display may be configured to provide text and/or visual data using pixels with sufficient optical transmissivity and/or transparency to allow a user to optically view through the first display to text and/or visual data on the underlying second display. The first display may be configured to operate in a screensaver mode during periods of non-active use.

In particular embodiments, the first display may be configured to automatically optically block viewability therethrough to inhibit external viewing of the second display during periods of non-use. In addition or alternatively, the first display may be configured to electrically lock access to the second display by providing a password restricted access entry region on the first display and optically blocking the remainder of the first display while the second display carries text and visual data thereon to inhibit unauthorized use of the device.

Other embodiments are directed to computer program products for selectively displaying text or visual data. The computer program product can include a computer usable storage medium having computer-readable program code embodied in the medium. The computer-readable program code can include: (a) computer readable program code that is configured to receive a wireless communication signal in a wireless terminal; (b) computer readable program code that is configured to direct a first display to display text and/or visual data associated with the received wireless communication signal; and (c) computer readable program code that is configured to concurrently direct a second display disposed under the first display to display text and/or visual data associated with the received wireless communication signal.

It is noted that features of embodiments of the invention as described herein may be methods, systems, computer programs or a combination of same although not specifically stated as such. The above and other embodiments will be described further below.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will be appreciated that although discussed with respect to a certain embodiment, features or operation of one embodiment can apply to others.

In the drawings, the thickness or size of lines, layers, features, components and/or regions may be exaggerated for clarity. It will be understood that when a feature, such as a layer, region or substrate, is referred to as being "on" another feature or element, it can be directly on the other element or intervening elements may also be present. In contrast, when an element is referred to as being "directly on" another feature or element, there are no intervening elements present. It will also be understood that, when a feature or element is referred to as being "connected" or "coupled" to another feature or element, it can be directly connected to the other element or intervening elements may be present. In contrast, when a feature or element is referred to as being "directly connected" or "directly coupled" to another element, there are no intervening elements present.

The terms "comprises, comprising" and derivatives thereof, mean that the recited feature, operation, integer, component, step, and the like is present but does not exclude or preclude the presence or addition of one or more alternative or different features, integers, steps, components or groups.

As used herein, the term "display device" is a device that is configured with a plurality of displays. The display device may be a "portable device" including portable communication devices such as a PALM PILOT, laptop, notebook or other portable computer including wireless and non-wireless terminal configurations. The term "wireless terminal" may include, but is not limited to, a cellular wireless terminal with or without a multi-line display; a Personal Communications System (PCS) terminal that may combine a cellular wireless terminal with data processing, facsimile and data communications capabilities; a PDA (personal digital assistant) that can include a wireless terminal, pager, internet/intranet access, web browser, organizer, calendar and/or a GPS receiver; and a conventional laptop and/or palmtop receiver or other appliance that includes a wireless terminal transceiver. Wireless terminals may also be referred to as "pervasive computing" devices and may be mobile terminals including portable radio communication equipment. Thus, the term "portable device" (which can also be referred to interchangeably as "a mobile terminal") includes all portable equipment such as mobile telephones, pagers, and communicators, including, but not limited to, smart phones, electronic organizers, and the like.

Figure 1:
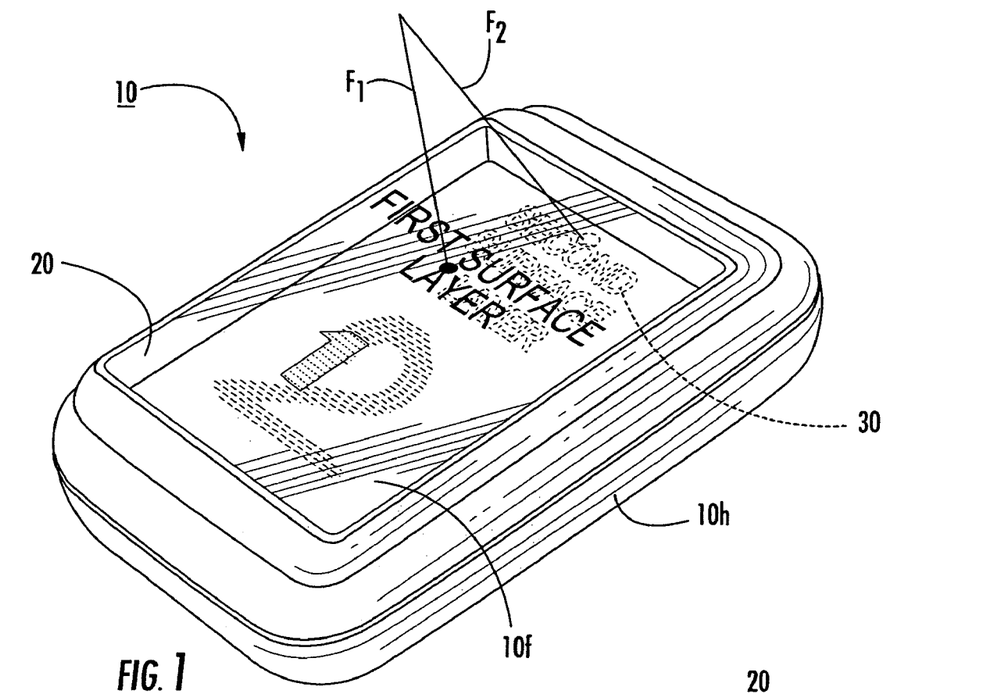
FIG. 1 is a perspective view of a portable terminal having multiple layered displays according to embodiments of the present invention.
Figure 9:
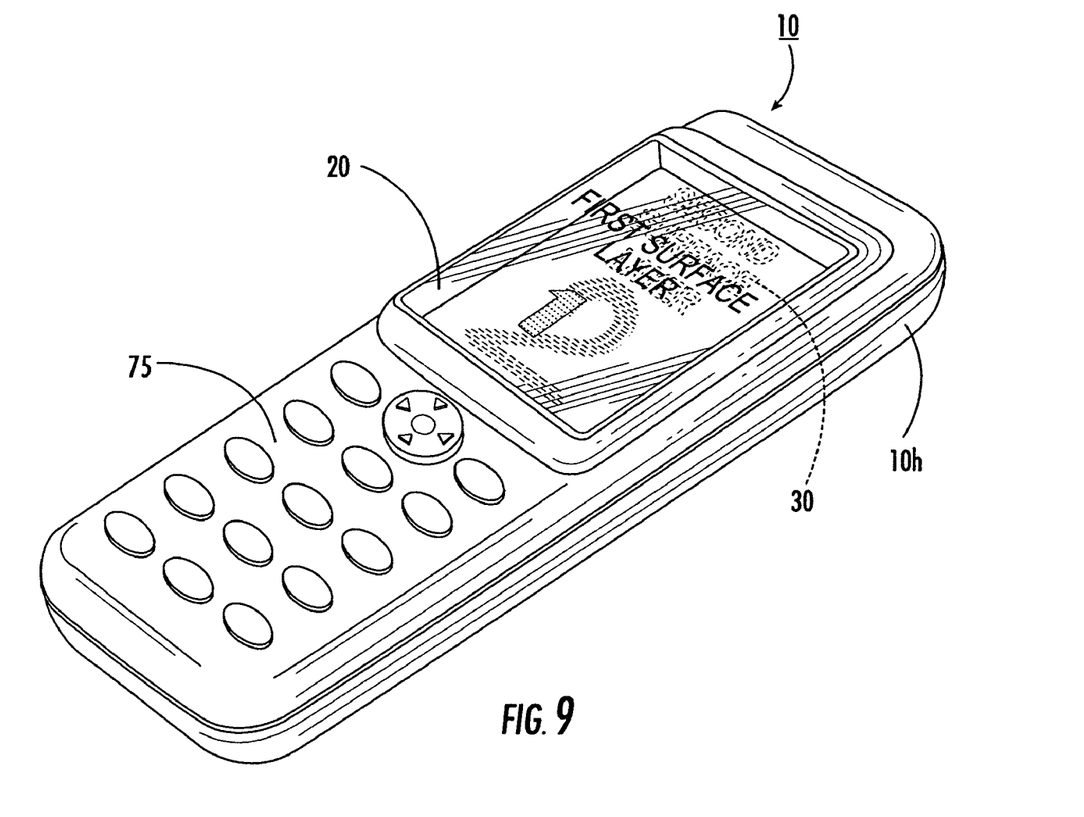
FIG. 9 is a perspective view of a portable terminal having multiple adjacently positioned layered displays and a keypad entry according to embodiments of the present invention.

Embodiments of the present invention will now be described in detail below with reference to the figures. FIG. 1 illustrates a wireless terminal device 10 that includes a housing 10h and first and second displays 20, 30, respectively. The device 10 may also include other electronic components such as those shown in FIG. 10, including a printed circuit board 40, a transceiver 50, and a battery 60. In addition, the device 10 may also optionally include a keypad 75 (FIG. 9). The first display 20 can also provide a protective barrier for the underlying second display 30, with each display held in proximity by the housing 10h. Using the "Z" dimension to present data can increase the amount (typically twice the size) of visual area in a relatively limited perimeter or footprint (without requiring a slide out or added length in the "X and/or Y" dimension). The user can use natural optical focusing to adjust to a target viewing plane or focal point to view desired text or visual data on either or both of the displays 20, 30.

In certain particular embodiments, the data displayed across the Z-spatial dimension on multiple layered displays may be configured to cooperate to provide a three-dimensional data presentation.

The two displays 20, 30 may be configured to abut or be held in close, but spaced apart, proximity. The two displays 20, 30 may be sized and configured to be aligned and substantially coextensive with each other. In other embodiments, one of the displays 20, 30 may be longer, wider and/or larger (or shorter, more narrow or smaller) than the other (not shown). In addition, the displays 20, 30 may be substantially the same size but may be misaligned side to side and/or top to bottom so that they are offset in the "X" and/or "Y" dimension (not shown). In addition, although shown as two (dual layered) displays, additional displays in additional layers may also be used, as long as the focal lengths and optical viewability are such that a user can view data on the different displays.

Referring again to FIG. 1, the first display 20 has a first focal length $F_1$ while the second display 30, that is located beneath the first display 20, has a longer focal length $F_2$, with respect to a user. The first and second displays 20, 30 can concurrently operate to present desired data. For example, as shown in FIG. 1, the first display 20 has a first viewing surface that is positioned closer to the user and presents text or visual data (shown as "First Layer" with the number "1") while the second underlying display 30 also presents text and/or visual data (shown as "Second Layer" with the number "2") with the second layer of data presented a further distance away from the first viewing surface. Thus, data can be concurrently displayed to a user in at least two different "Z" or depth dimensions. In operation, a user can optically shift or adjust his/her focus and/or selectively view data on either or both displays, without requiring any hardware to shift the data into focus on the displays 20, 30. Thus, for example, a user can look past the first display 20 to view and/or focus on data presented by the second display 30.

In certain embodiments, the first display 20 can be configured to be sufficiently optically transparent, translucent or transmissive so as to allow a user to optically view the data on the second display 30 through the first display 20. In particular embodiments, the first display 20 can be semi-transparent while the second display 30 can be a color graphic display. For example, the first display 20 can be substantially transparent with pixels that become semi-transparent during operation (such as when activated). The first display 20 may be monochromatic with up and/or down-lighted pixels that display textual (alphanumeric) data or information, messages, symbols, and the like. The first display 20 may be configured with pixels that are semi-transparent and/or partially illuminated to allow a user to look past and/or through the active pixels to the underlying display 30. The first display 20 may operate with adjustable pixel illumination.

The second display 30 can be a (typically full) color graphic display with increased (typically relatively "high") resolution over that of the first display 20. The second display 30 can present images, pictures, video clips, menus, program icons, as well as text data. The second display 30 can be a ⅛ VGA display. The second display 30 may provide the primary display and be the primary carrier of information, options, navigational control, status locator, email access, or orientation tracking, and the like. For example, the second display 30 may be configured to comprise a standard operating interface desktop type data format while the first display may be configured to present less data (or be less cluttered) with related and/or unrelated data.

In certain embodiments, the first and second displays 20, 30 can interactively engage. Thus, in certain embodiments, a user can edit/ read and/or write or draw text on the first display 20 (such as on the primary outwardly facing top surface) and view simultaneously through the first display 20 to see the underlying second display 30 to view menu options, images next/previous action taken, and the like. In operation, depending on which display the user is focusing on, one display (providing an information layer) may be visually or optically perceived as more active or dominant than the other. Using dual layered display configurations where a user can visually shift focus or select target viewing regions to view desired data on one or more of the displays 20, 30.

The interaction or visual cooperation between the two displays 20, 30 can be configured to provide three-dimensional features, i.e., when selecting an item on a menu on the second layered display 30, the icon or feature may optically pop-up or out in the "Z" direction toward the first display 20 and the user to be visually acknowledged or perceived as being active, highlighted and/or in active mode.

In particular embodiments, retrieving, editing, reading, viewing and sending data using one of the displays can be undertaken independently rather than interactively.

Figure 2:
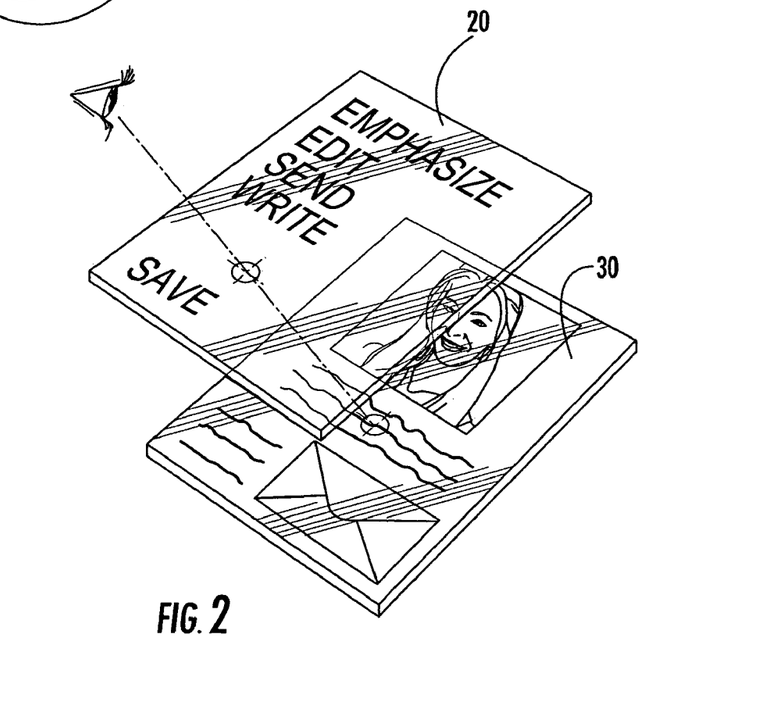
FIG. 2 is an exploded view of multi-layered displays according to embodiments of the present invention.

For example, the first display 20 can activate, upon direction, demand and/or request, to communicate with the underlying display 30 to carry out certain actions (typically responsive and/or dependent on data on the second display 30). The first display 20 may extract data from the data on the second display 30 to thereby present a subset of the data on the second display 30. The first display 20 may also or alternatively provide certain predetermined actions such as display text data, messages, symbols or icons for certain actions (such as arrows, rings or other marking symbols). For example, as shown in FIG. 2, the user can concurrently view the first and second displays 20, 30 (shown by the optic line drawn through the top display 20 and down to the second display 30). The first display 20 can be used to select features or pixels of the data on the second display 30 to edit, enhance, enlarge, select an action or icon, deselect an action or icon, and the like. The first and second displays 20, 30 can communicate to save updates or inputs made on the first display 20 with data on the second display 30. As shown, the first and/or display may include a "save" grid location. The first display can highlight a target function selectable on the second display 30 by "marking" an object using a symbol (ring, arrow, and the like) displayable on the first display 20 to select the option or object on the second display 30. The first display 20 may be used to enlarge the text/font or image on the second display 30 to improve readability or clarity. Other examples of interactive and/or individual display operations will be described further below.

Figure 3:
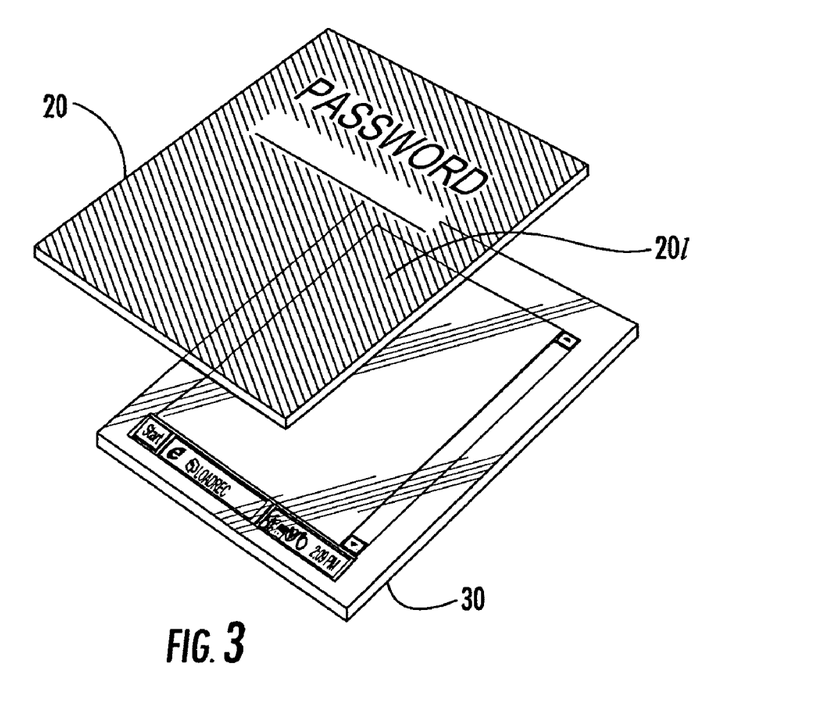
FIGS. 3–8 are exploded views of layered displays with exemplary display operation according to embodiments of the present invention.

Referring to FIG. 3, in certain embodiments, the first display 20 can provide a "screensaver" mode. In particular embodiments, the first display 20 can be configured to provide a desktop security "lock" feature 20l by optically blocking optic viewing through the first display 20. The first display 20 may turn black and/or illuminate substantially all pixels to inhibit viewing of data on the second display 30 (which may be active during this mode) during the lockout mode. The first display 20 may be configured to not illuminate or only partially illuminate pixels allowing password entry or otherwise be configured to accept user input of a password or "secret" activation action. The screensaver and/or lockout modes may automatically engage after a non-active interval and/or upon a request by the user.

Figure 4:
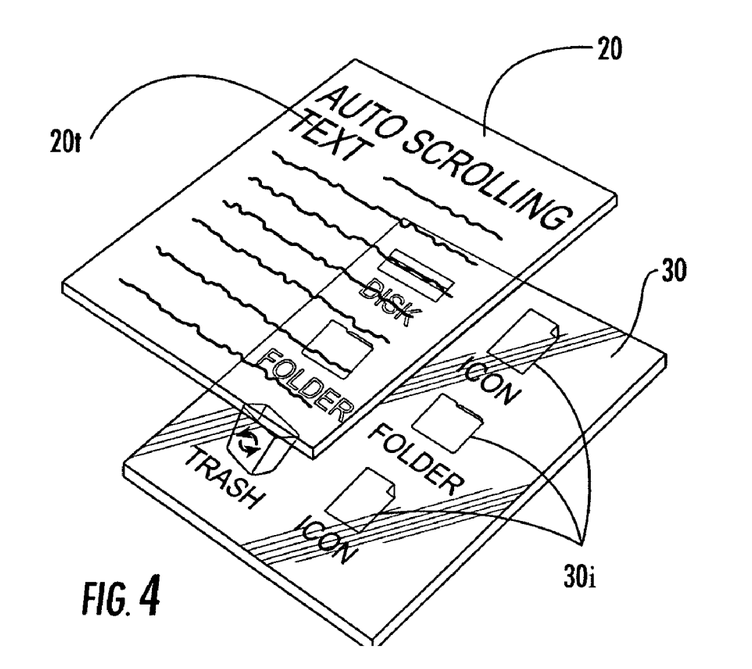

FIG. 4 illustrates that the first display 20 may be configured to provide text messages 20t (incoming and/or outgoing) while the second display 30 provides a desktop menu of icons 30i of application programs and/or services. In certain embodiments, the text message 20t may comprise an auto-scrolling text message.

Figure 5:
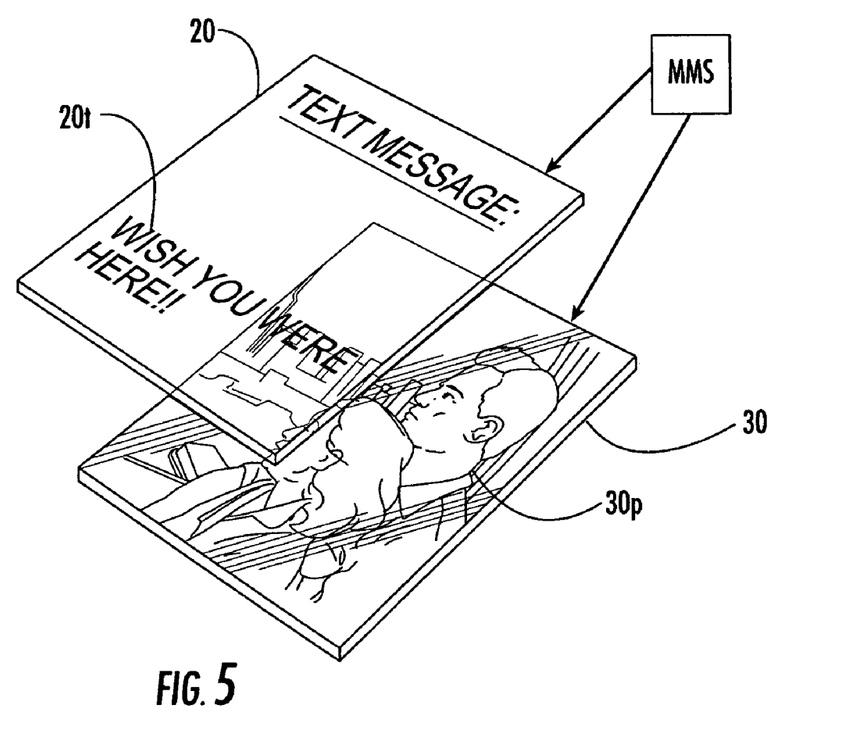
Figure 6:
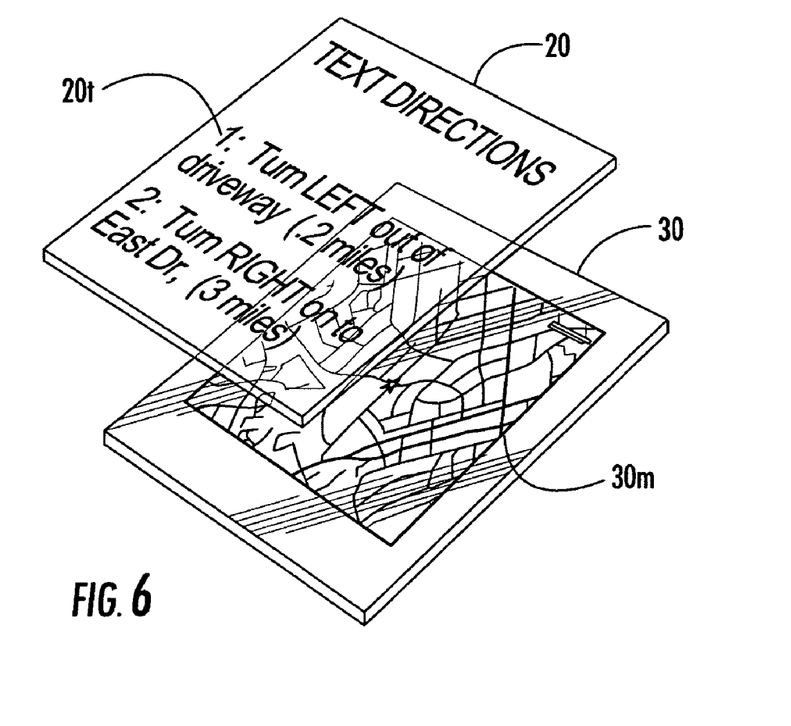

FIG. 5 illustrates that the two displays can present selected related data for a message or digital communication. For example, the second display 30 can present an image 30p while the first display 20 presents text 20t related to the image 30p. The message may be a message with multiple different communication media, such as an MMS message, which can be parsed into separate media segments so that selected text is displayed on the first display 20 and the image(s), pictures and/or video clips can be downloaded and concurrently displayed on the second display 30. FIG. 6 illustrates that the message or communication can be from a position (navigation or map routing/guiding) service. The message or communication can include text data and a geographical map image 30m with related direction or other text, the map image 30m can be displayed on the second display 30 with certain (or all of the related text) presented on the first display 20.

Figure 7:
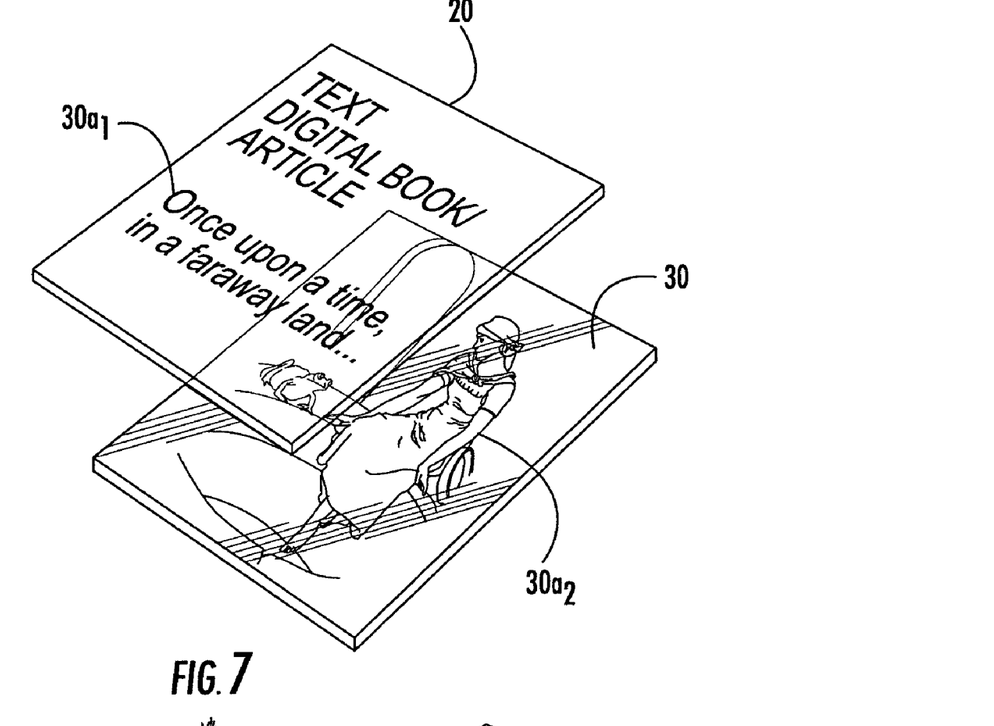

FIG. 7 illustrates that the communication may be a digital book or article that can be electronically provided to a user using the wireless device 10. In operation, corresponding text $30a_1$ may be presented on the first display 20 while one or more related images $30a_2$ from a scene, picture or video clip may be displayed on the second display 20. The text may also be a news article or other copyrightable material with an appended image. For example, the user may subscribe to a news service that provides "breaking" news or short news summaries with the article or summary having multi-media text, audio and/or image or other visual components. The text may be presented in auto-scrolling format over the first display 20 with a video clip played behind the text on the second display 30.

Figure 8:
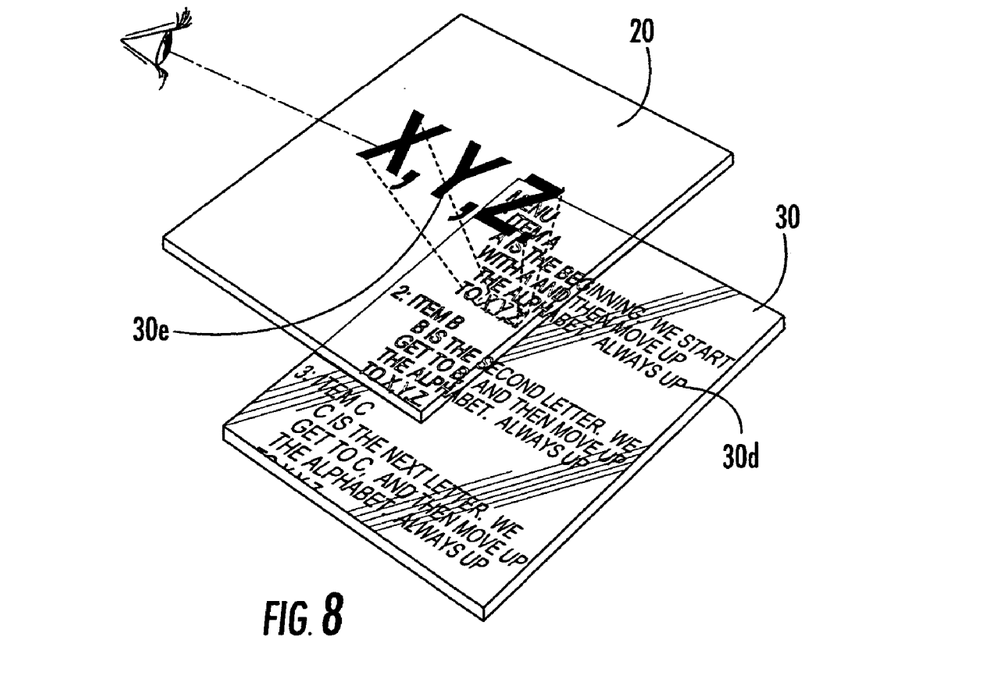

FIG. 8 illustrates that a document 30d may be presented on the second display 30 and the first display 20 can present extracted text 30e from the document 30d for viewing. The second display 20 may enlarge the extracted text 30e and/or allow a user to edit the underlying document 30d. The edited text can then be communicated to the second display and the record updated in memory accordingly.

Figure 10:
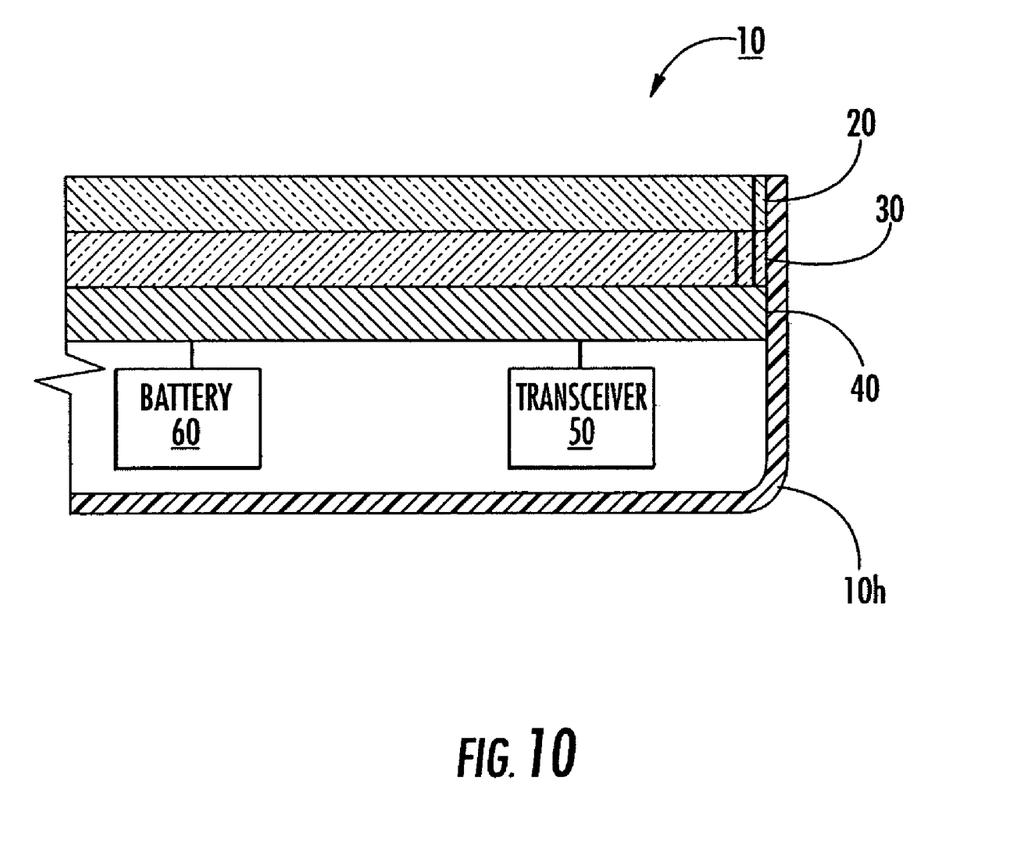
FIG. 10 is a side view of a wireless terminal with dual layered displays according to embodiments of the present invention.

FIG. 10 is a side cross-sectional view of one embodiment of a portable device that can be configured as a wireless terminal 10 with the first display 20 and the second display 30 positioned to the left (above) a printed circuit board 40 and in communication with a transceiver 50 and battery 60.

A conventional arrangement of electronic components that allow a wireless terminal to transmit and receive wireless terminal communication signals will be described in further detail. Non-wireless configurations do not require the transceiver. An internal and/or external antenna associated with the wireless terminal device 10 is configured for receiving and/or transmitting wireless terminal communication signals and is electrically connected to transceiver circuitry components 50. The transceiver components can include a radio-frequency (RF) transceiver that is electrically connected to a controller such as a microprocessor. The controller can be electrically connected to a speaker that is configured to transmit a signal from the controller to a user of a wireless terminal. The controller can also electrically connected to a microphone that receives a voice signal from a user and transmits the voice signal through the controller and transceiver to a remote device. The controller can be electrically connected to a keypad and the displays that facilitate wireless terminal operation. The design of the transceiver, controller, and microphone are well known to those of skill in the art and need not be described further herein.

The wireless communication device 10 shown in FIG. 10 may be a radiotelephone type radio terminal of the cellular or PCS type, which makes use of one or more antennas according to embodiments of the present invention.

Antennas, according to embodiments of the present invention may be useful in, for example, multiple mode wireless terminals that support two or more different resonant frequency bands, such as world phones and/or dual mode phones. In certain embodiments, the wireless device 10 can operate in multiple frequency bands such as at least one low frequency band and at least one high frequency band. The terms "low frequency band" or "low band" are used interchangeably and, in certain embodiments, include frequencies below about 1 GHz, and typically comprises at least one of 824–894 MHz or 880–960 MHz. The terms "high frequency band" and "high band" are used interchangeably and, in certain embodiments, include frequencies above 1 GHz, and typically frequencies between about 1.5–2.5 GHz. Frequencies in high band can include selected ones or ranges within about 1700–1990 MHz, 1990–2100 MHz, and/or 2.4–2.485 GHz. The device 10 may be configured to support GPS and/or Bluetooth operations, as well as other positioning systems such as GALILEO, GONAS, and the like.

In certain embodiments, the device 10 may be configured to provide resonance for a global positioning system (GPS) as the terminal 10 can include a GPS receiver. GPS operates at approximately 1,575 MHz. GPS is well known to those skilled in the art. GPS is a space-based triangulation system using satellites and computers to measure positions anywhere on the earth. Compared to other land-based systems, GPS is less limited in its coverage, typically provides continuous twenty-four hour coverage regardless of weather conditions, and is highly accurate. In the current implementation, a constellation of twenty-four satellites that orbit the earth continually emit the GPS radio frequency. The additional resonance of the antenna as described above permits the antenna to be used to receive these GPS signals.

The display(s) may be configured to operate with touchscreen input. Suitable software and associated locational grid hardware and operating structures are well known to those of skill in the art. See e.g. U.S. Pat. No. 3,857,022 to Rebane et al., entitled *Graphic Input Device*; U.S. Pat. No. 5,565,894 to Bates et al., entitled *Dynamic Touchscreen Button Adjustment Mechanism*. The contents of these documents are hereby incorporated herein by reference as if recited in full. In certain embodiments, the wireless communication device 10 can include a touchscreen on the first display 20 and a keyboard or keypad entry 75 as shown in FIG. 9. The keypad 75 may be an accessory item that may be added or removed depending on the set-up desired by the user or OEM. Alternatively, the keypad 75 may be mounted on a flip member or configured to reside mounted on the housing 10h over the first display 20.

In particular embodiments, the displays 20, 30 can be sized and configured to cover a major portion of the area defined by a forward primary surface 10f (FIG. 1). The displays 20, 30 can be configured and sized to extend to cover about 75% or more, and typically about 90% or more, of the forward surface 10f.

Embodiments of the present invention are described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 11:
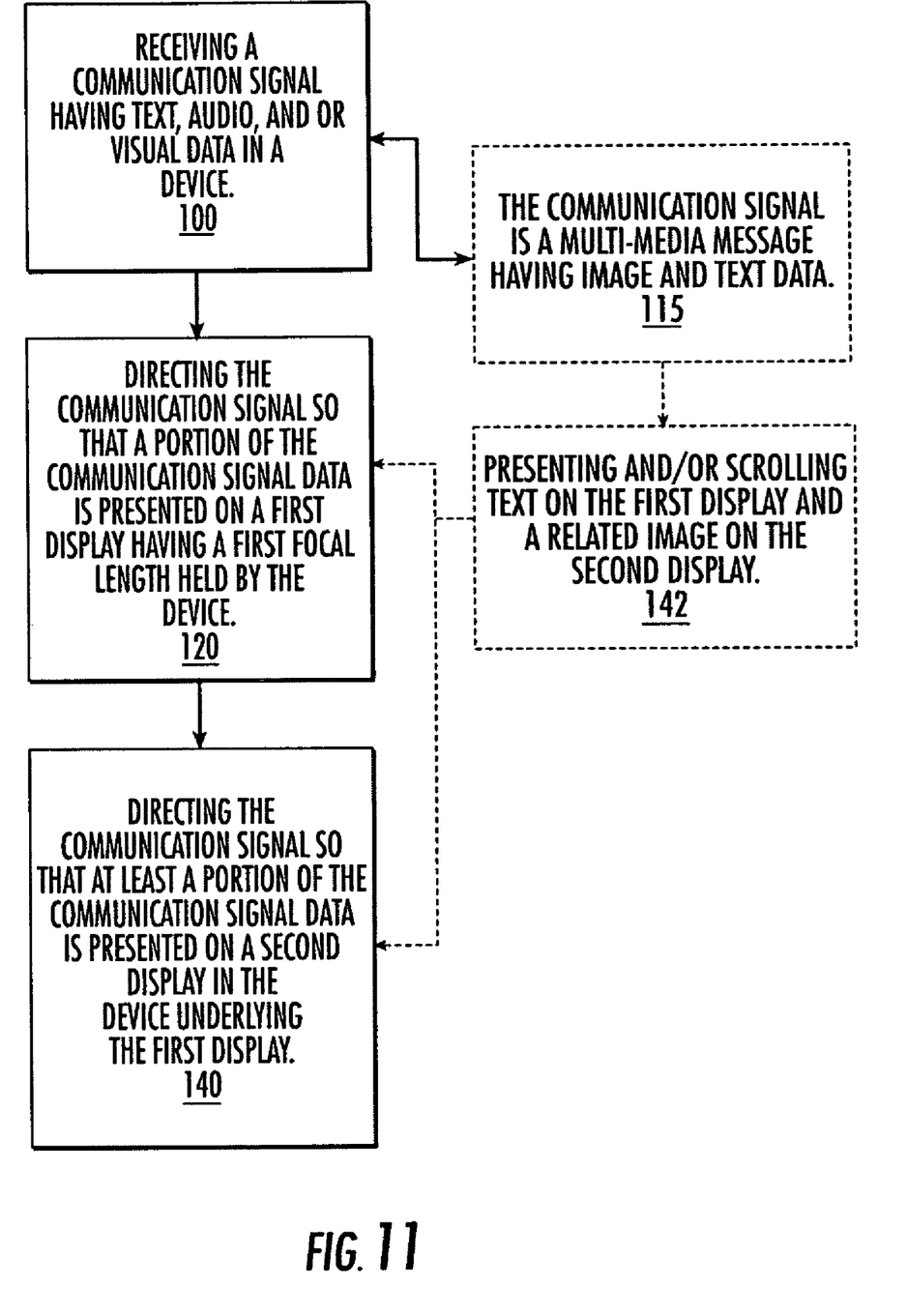
FIG. 11 is a flow chart of operations that can be performed according to embodiments of the present invention.

FIG. 11 is a block diagram of exemplary embodiments of display formats that illustrate systems, methods, and/or computer program products in accordance with embodiments of the present invention. As shown, a wireless device receives a wireless communication signal having text, audio and/or visual data (block 100). The communication signal is directed so that a portion of the communication signal data is presented on a first display having a first focal length (block 120) and so that at least a portion of the communication signal is presented on a second display in the wireless device underlying the first display (block 140). The communication signal may be a multi-media message having image and text data (block 115) and text data can be displayed on the top display with the related image displayed concurrently on the lower second display (block 142).

Figure 12:
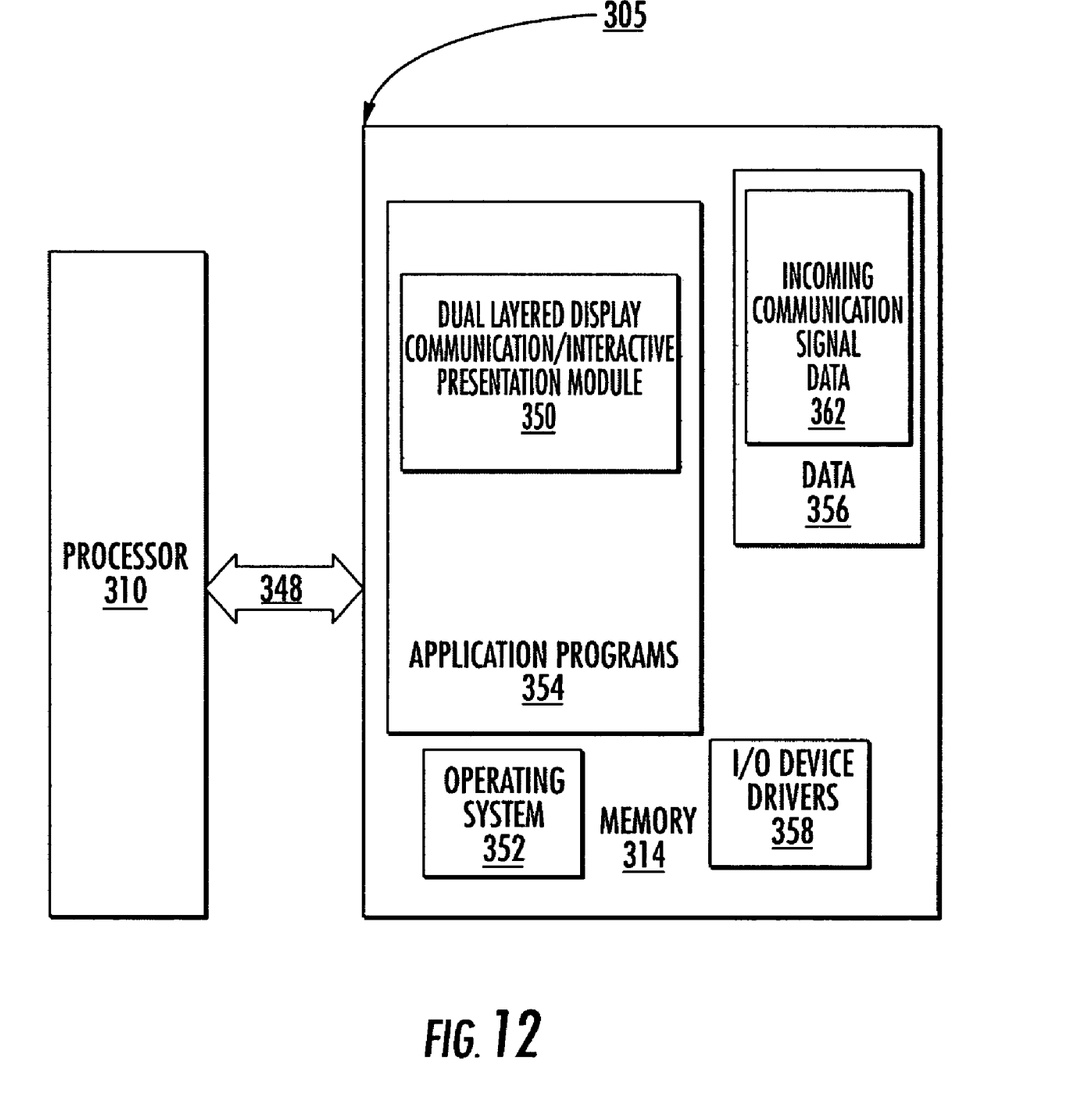
FIG. 12 is a block diagram of an exemplary data processing system according to embodiments of the present invention.

FIG. 12 is a block diagram of exemplary embodiments of data processing systems that illustrates systems, methods, and/or computer program products in accordance with embodiments of the present invention. The processor 310 communicates with the memory 314 via an address/data bus 348. The processor 310 can be any commercially available or custom microprocessor. The memory 314 is representative of the overall hierarchy of memory devices containing the software and data used to implement the functionality of the data processing system 305. The memory 314 can include, but is not limited to, the following types of devices: cache, ROM, PROM, EPROM, EEPROM, flash memory, SRAM, and DRAM.

As shown in FIG. 12, the memory 314 may include several categories of software and data used in the data processing system 305: the operating system 352; the application programs 354; the input/output (I/O) device drivers 358; an automated dual layered display communication/interactive presentation module 350 that directs the interaction of the two displays and/or which of the two displays to use to present selected data on; and data 356.

The data 356 may include incoming and/or outgoing communication signal data 362. As will be appreciated by those of skill in the art, the operating system 352 may be any operating system suitable for use with a data processing system, such as OS/2, AIX or OS/390 from International Business Machines Corporation, Armonk, N.Y., WindowsXP, WindowsCE, WindowsNT, Windows95, Windows98 or Windows2000 from Microsoft Corporation, Redmond, Wash., PalmOS from Palm, Inc., MacOS from Apple Computer, UNIX, FreeBSD, or Linux, proprietary operating systems or dedicated operating systems, for example, for embedded data processing systems.

The I/O device drivers 358 typically include software routines accessed through the operating system 352 by the application programs 354 to communicate with devices such as I/O data port(s), data storage 356 and certain memory 314 components and/or the image acquisition system 320. The application programs 354 are illustrative of the programs that implement the various features of the data processing system 305 and preferably include at least one application that supports operations according to embodiments of the present invention. Finally, the data 356 represents the static and dynamic data used by the application programs 354, the operating system 352, the I/O device drivers 358, and other software programs that may reside in the memory 314.

While the present invention is illustrated, for example, with reference to the Dual Layered Display Module 350 being an application program in FIG. 12, as will be appreciated by those of skill in the art, other configurations may also be utilized while still benefiting from the teachings of the present invention. For example, the Module 350 may also be incorporated into the operating system 352, the I/O device drivers 358 or other such logical division of the data processing system 305. Thus, the present invention should not be construed as limited to the configuration of FIG. 12, which is intended to encompass any configuration capable of carrying out the operations described herein.

The I/O data port can be used to transfer information between the data processing system 305 and a computer network 320 (e.g., the Intranet or Internet) or another computer or communication system or other device controlled by the processor. These components may be conventional components such as those used in many conventional data processing systems, which may be configured in accordance with the present invention to operate as described herein.

In the drawings and specification, there have been disclosed embodiments of the invention and, although specific terms are employed, they are used in a generic and descriptive sense only and not for purposes of limitation, the scope of the invention being set forth in the following claims. Thus, the foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for providing text and/or visual data to a display system of a portable communications device, comprising:
   presenting text and/or visual data on a first display;
   presenting a different visual presentation of text and/or visual data substantially concurrently on a second display underlying the first display, such that the second display is a further distance away from an eye of a user than the first display, wherein, in operation, a user is able to view data on the first and/or second display, and wherein one of the first and second displays is configured to present an operating interface desktop with user selectable menu items;
   electronically selecting a feature, text or indicia using the first display within content of an application on the second display to navigate; and
   electrically locking access to the device by providing a password restricted access entry region on the first display and optically blocking the remainder of the first display while the second display carries text and visual data thereon to inhibit unauthorized use of the device while the device is operating.

2. A method according to claim 1, wherein the first and second displays are aligned so that the user can view data on both of the displays at the same time, and wherein the user can focus on one of the displays by optically altering his/her focus to a focal length corresponding to the desired display, the method further comprising providing contrast and three dimensional effect to a user using the first and second displays so that certain features, text or objects optically project outward toward a user.

3. A method according to claim 2, wherein the second display is a color graphic display, and wherein the first display is monochromatic.

4. A method according to claim 2, wherein the second display is configured with the operating interface desktop and has increased resolution over that of the first display.

5. A method according to claim 1, wherein the data on the first display comprises textual data, and wherein the data on the second display comprises visual data, and wherein the first and second displays are linked to simultaneously display related incoming communication data transmitted using a computer network.

6. A method according to claim 5, wherein the visual data comprises an image.

7. A method according to claim 5, wherein the textual data provided by the first display comprises data from a digital book or article, and wherein the visual data provided by the second display is video clips, images and/or pictures from the digital book or article.

8. A method according to claim 1, further, comprising:
generating a MMS message having text and visual data and parsing the message data such that text presents on the first display and visual data presents on the second display.

9. A method according to claim 8, further comprising receiving an MMS message having text and visual data and parsing the text data to present on the first display and the visual data to present on the second display.

10. A method according to claim 8, wherein automatically scrolling text is presented on the first display and video related to the text is presented on the second display.

11. A method according to claim 1, further comprising configuring the first and second displays to interactively communicate in response to actions by the user.

12. A method according to claim 1, further comprising illuminating pixels on the first display in a manner that allows the user to view through the illuminated pixels to the second display.

13. A method according to claim 1, wherein the first display is configured to operate in a screensaver mode during periods of non-active use while the second display is operative to carry at least one of text and visual data thereon to thereby inhibit unauthorized use or viewing.

14. A method according to claim 1, wherein the steps of presenting visual and/or text data on the first and second displays comprise presenting text on the first display while presenting an image related to the text on the second display and wherein the visual and textual data comprises incoming or outgoing communication data transmitted using a computer network.

15. A method according to claim 1, further comprising:
presenting text comprising map directions of a geographic location of interest on a first display; and
presenting visual data image comprising a map corresponding to the location of interest substantially concurrently on a second display underlying the first display, such that the second display is a further distance away from an eye of a user than the first display, wherein, in operation, a user is able to view data on the first and second display.

16. A method according to claim 1, wherein the second display provides visual and textual data and the first display is adapted to selectively present a subset of the data provided by the second display, and wherein the first and second displays are interactively communicating during the presenting steps.

17. A method according to claim 1, wherein the presenting steps are carried out with at least one of the displays presenting moving graphics.

18. A method according to claim 1, wherein content on the first and second displays are linked so that as text scrolls or changes on one display, visual images change automatically on the other.

19. A method according to claim 1, wherein the electronically selecting a feature, text or indicia using the first display is configured to interact with non-map related content of the application on the second display.

20. A method according to claim 1, wherein the electronically selecting a feature, text or indicia using the first display is configured to allow a user to electronically carry out at least one of the following: emphasize, edit, save, send or write to, content of the application on the second display.

21. A method according to claim 20, wherein the electronically selecting is configured to allow a user to electronically select to emphasize, edit, save, send and write to content of the application on the second display.

22. A method according to claim 1, wherein the first and second displays cooperate to provide a feature with a three-dimensional visual appearance.

23. A method according to claim 1, wherein the first display is configured to present text messages while the second display presents the desktop menu of icons.

24. A method according to claim 1, wherein the first and second displays cooperate to display an incoming multimedia content service message from a media service provider using a computer network.

25. A dual layered display assembly of a portable communications device, comprising:
a first display;
a second display positioned adjacent to and under the first display;
wherein one of the first and second displays is configured to present an operating interface desktop with user selectable menu items;
wherein the first display is configured to electrically lock access to the second display by providing a password restricted access entry region on the first display and optically blocking the remainder of the first display while the second display carries at least one of text and visual data thereon and while the portable communications device is operating to inhibit unauthorized use of the device.

26. An assembly according to claim 25, wherein, in operation, the first display is configured to provide text and/or visual data using pixels with sufficient optical transmissivity and/or transparency to allow a user to optically view through the first display to text and/or visual data on the underlying second display, and wherein the first and second displays are linked to simultaneously display related incoming or outgoing communication content.

27. An assembly according to claim 25, wherein the first display is configured as a monochromatic display and the second display is configured as a color graphic display, and wherein the assembly is configured so that content within an application on the second display can be navigated by electronically selecting a feature, text or indicia using the first display.

28. An assembly according to claim 25, wherein the first and second displays are aligned and positioned so that the first and second displays are substantially coextensive with each other, and wherein the first and second displays are configured to cooperate to provide contrast and three dimensional effect to a user so that certain features, text or objects optically project outward toward the user.

29. An assembly according to claim 25, wherein, when in use and positioned relative to the eye(s) of a user, the second display has a focal length that is longer than the focal length of the first display, and wherein, in operation, a user is able to selectively view data on the first and/or second display by optically shifting his/her focus.

30. An assembly according to claim 25, wherein the first and second displays are aligned so that the user can view data on both of the displays at the same time.

31. An assembly according to claim 25, wherein the first and second displays are configured to interactively communicate in response to actions input by the user.

32. An assembly according to claim 25, wherein, in operation, the first display is configured to illuminate pixels in a manner that allows the user to view through the illuminated pixels to electronically access menu items and data on the second display while user input text or incoming or outgoing messages can be displayed on the first display.

33. An assembly according to claim 25, wherein the first display is configured to automatically optically block viewability therethrough to inhibit external viewing of the second display during periods of non-use.

34. An assembly according to claim 25, further comprising:
a terminal housing holding the first and second displays; and
terminal circuit components in the housing to provide a computer terminal.

35. An assembly according to claim 25, further comprising:
a portable terminal housing holding the first and second displays; and
portable terminal circuit components in the housing to provide a portable computer terminal in a portable communications device.

36. An assembly according to claim 25, further comprising:
a wireless terminal housing holding the first and second displays; and
wireless terminal circuit components in the housing to provide a wireless computer terminal.

37. An assembly according to claim 25, wherein the second display is configured with the operating interface desktop.

38. A wireless terminal, comprising:
(a) a housing configured to enclose a transceiver that transmits and receives wireless communications signals;
(b) a first display in communication with the transceiver and held in the housing so that a corresponding first viewing surface is externally viewable; and
(c) a second display in communication with the transceiver and held in the housing beneath the first display so that a corresponding second viewing surface is externally viewable,
wherein the wireless terminal is configured to concurrently present data on the first and second displays and wherein the second display is configured to present an operating interface desktop with user selectable menu items, and
wherein the first display is configured to electrically lock access to the second display by providing a password restricted access entry region on the first display and optically blocking the remainder of the first display while the second display carries text and visual data thereon to inhibit unauthorized use of the device while the wireless terminal is operating.

39. A wireless terminal according to claim 38, wherein measured from an eye of a user, the second display has a focal length that is longer than the first display, and wherein, in operation, a user is able to selectively view data on the first and/or second display by optically shifting his/her focus.

40. A wireless terminal according to claim 38, wherein the first and second displays are configured to interactively engage each other during operation.

41. A wireless terminal according to claim 38, wherein the wireless terminal is configured to review an incoming communication signal and parse the signal into visual and text data segments and then present selected text data on the first display and visual data on the second display.

42. A wireless terminal according to claim 41, wherein the incoming communication signal comprises a MMS message with at least one image and text, and wherein the wireless terminal is configured to review the message and direct the signal so that at least some of the text is presented on the first display while the at least one image is presented on the second display.

43. A wireless terminal according to claim 38, wherein, in operation, the first display is configured to provide text and/or visual data using pixels with sufficient optical transmissivity and/or transparency to allow a user to optically view through the first display to text and/or visual data on the underlying second display.

44. A wireless terminal according to claim 38, wherein the first display is configured as a substantially transparent display and the second display is configured as a color graphic display.

45. A wireless terminal according to claim 44, wherein the first and second displays are aligned and positioned so that the first and second displays are substantially coextensive with each other.

46. A wireless terminal according to claim 38, wherein the first display is configured to operate in a screensaver mode during periods of non-active use while the wireless terminal is operating.

47. A wireless terminal according to claim 38, wherein the first display is a monochromatic display configured to display optically transmissive pixels, and wherein the second display is a color graphic display.

48. A computer program product for selectively displaying text or visual data, the computer program product comprising a computer usable storage medium having computer-readable program code embodied in the medium, the computer-readable program code comprising:
computer readable program code that is configured to receive a wireless communication signal in a wireless terminal;
computer readable program code that is configured to direct a first display to display text and/or visual data associated with the received wireless communication signal;
computer readable program code that is configured to concurrently direct a second display disposed under the first display to display text and/or visual data associated with the received wireless communication signal;
computer readable program code that is configured to display an operating interface with user selectable menu items on the second display; and
computer readable program code that is configured to electrically lock access to the second display by providing a password restricted access entry region on the first display and optically blocking the first display while the second display carries text and visual data thereon to inhibit unauthorized use of the device while the wireless terminal is operating.

49. A computer program product according to claim 48, wherein the first display is a transparent and/or translucent display and the second display is a color graphic display.

50. A computer program product according to claim 48, further comprising computer program code that is configured to provide dynamic interactive communication between the first and second displays to display data associated with incoming or outgoing messages.

51. A portable communications wireless terminal device, comprising:
   (a) a housing configured to enclose a transceiver that transmits and receives wireless communications signals;
   (b) a first display in communication with the transceiver and held in the housing so that a corresponding first viewing surface is externally viewable; and
   (c) a second display in communication with the transceiver and held in the housing beneath the first display so that a corresponding second viewing surface is externally viewable,
   wherein the wireless terminal is configured to concurrently present data on the first and second displays, and wherein the first display is configured to electrically lock access to the second display by providing a password restricted access entry region on the first display and optically blocking the remainder of the first display while the second display carries text and visual data thereon and while the portable communications device is operating to inhibit unauthorized use of the device.

52. A handheld wireless terminal portable communications device having telephone capacity, comprising:
   a hand-held housing configured to enclose a transceiver that transmits and receives wireless communications signals;
   a first display in communication with the transceiver and held in the housing so that a corresponding first viewing surface is externally viewable; and
   a second display in communication with the transceiver and held in the housing beneath the first display so that a corresponding second viewing surface is externally viewable,
   wherein the second display is configured to present an operating interface desktop with user selectable menu items,
   wherein the first and second displays are configured to interactively communicate,
   wherein the device is configured to concurrently present different visual presentations of text, graphic and/or pictorial data on the first and second displays; and
   wherein the first display is configured to electrically lock access to the second display by providing a password restricted access entry region on the first display and optically blocking the first display to inhibit viewability of the second display while the second display carries text and visual data thereon to inhibit unauthorized use of the device while the wireless terminal is operating.

53. A device according to claim 52, wherein the displays are configured to cooperate to at least one of enlarge, move, highlight, emphasize, select or project data, text or features on one display with the other display.

* * * * *